United States Patent
Kulkarni et al.

(10) Patent No.: US 12,021,892 B2
(45) Date of Patent: Jun. 25, 2024

(54) MANAGED SOFTWARE REMEDIATION

(71) Applicant: McAfee, LLC, San Jose, CA (US)

(72) Inventors: Dattatraya Kulkarni, Bangalore (IN);
Srikanth Nalluri, Karnataka (IN); Raja Sinha, Bangalore (IN);
Venkatasubrahmanyam Krishnapur, Bangalore (IN)

(73) Assignee: McAfee, LLC, San Jose, CA (US)

( * ) Notice: Subject to any disclaimer, the term of this patent is extended or adjusted under 35 U.S.C. 154(b) by 422 days.

(21) Appl. No.: 16/382,805

(22) Filed: Apr. 12, 2019

(65) Prior Publication Data

US 2019/0238563 A1 Aug. 1, 2019

Related U.S. Application Data

(63) Continuation of application No. 14/913,722, filed as application No. PCT/US2013/077339 on Dec. 21, 2013, now Pat. No. 10,305,929.

(30) Foreign Application Priority Data

Sep. 27, 2013 (IN) ............................ 4384/CHE/2013
Sep. 27, 2013 (IN) ............................ 4389/CHE/2013

(51) Int. Cl.
*H04L 9/40* (2022.01)
*G06F 21/56* (2013.01)
(Continued)

(52) U.S. Cl.
CPC .......... *H04L 63/145* (2013.01); *G06F 21/568* (2013.01); *G06F 21/6245* (2013.01);
(Continued)

(58) Field of Classification Search
None
See application file for complete search history.

(56) References Cited

U.S. PATENT DOCUMENTS 7,870,387 B1 1/2011 Bhargava et al.
8,499,354 B1 7/2013 Satish et al.
(Continued)

FOREIGN PATENT DOCUMENTS

CN 101156156 A 4/2008
CN 101594248 A 12/2009
(Continued)

OTHER PUBLICATIONS

English Translation of the Rejection Reference cited in Chinese Office Action dated Nov. 27, 2019 for Chinese Application No. 201380079177.9.
(Continued)

*Primary Examiner* — Christopher C Harris
(74) *Attorney, Agent, or Firm* — Patent Capital Group

(57) ABSTRACT

There is disclosed in one example a remediation server including: a hardware platform, including a processor, a memory, and a network interface; and instructions encoded within the memory to instruct the processor to: receive an application binary; create an application logic model of the application binary; and create personalization rules for the application binary based on the application logic model.

9 Claims, 6 Drawing Sheets

(51) Int. Cl.
  *G06F 21/62* (2013.01)
  *H04W 12/08* (2021.01)
  *H04W 12/12* (2021.01)
  *H04W 12/128* (2021.01)

(52) U.S. Cl.
  CPC .......... *G06F 21/629* (2013.01); *H04L 63/102* (2013.01); *H04W 12/08* (2013.01); *H04W 12/12* (2013.01); *H04W 12/128* (2021.01)

(56) References Cited

U.S. PATENT DOCUMENTS

| | | | |
|---|---|---|---|
| 8,667,583 | B2 | 3/2014 | Polyakov et al. |
| 9,147,066 | B1 | 9/2015 | Tian et al. |
| 2008/0022405 | A1 | 1/2008 | Wang et al. |
| 2008/0109871 | A1* | 5/2008 | Jacobs .................. H04L 63/20 726/1 |
| 2010/0063855 | A1 | 3/2010 | Nguyen |
| 2011/0247071 | A1 | 10/2011 | Hooks et al. |
| 2012/0254982 | A1 | 10/2012 | Sallam |
| 2012/0290640 | A1 | 11/2012 | Mahaffey et al. |
| 2012/0317638 | A1 | 12/2012 | Carrara et al. |
| 2013/0055341 | A1 | 2/2013 | Cooper et al. |
| 2013/0097662 | A1 | 4/2013 | Pearcy et al. |
| 2013/0160126 | A1 | 6/2013 | Kapoor et al. |
| 2013/0227683 | A1 | 8/2013 | Bettini et al. |
| 2013/0254880 | A1 | 9/2013 | Alperovitch et al. |
| 2014/0040979 | A1 | 2/2014 | Barton et al. |
| 2014/0289853 | A1 | 9/2014 | Teddy et al. |
| 2015/0220730 | A1 | 8/2015 | Chen |
| 2015/0222636 | A1* | 8/2015 | Mahaffey ................ H04L 63/08 726/4 |
| 2015/0326586 | A1 | 11/2015 | Khesin |

FOREIGN PATENT DOCUMENTS

| | | |
|---|---|---|
| CN | 102082802 A | 6/2011 |
| CN | 102831043 A | 12/2012 |
| CN | 103108320 A | 5/2013 |
| CN | 103180862 A | 6/2013 |
| CN | 102160048 B | 4/2014 |
| EP | 1708114 A2 | 10/2006 |
| WO | 2015047443 A1 | 4/2015 |

OTHER PUBLICATIONS

PCT International Search Report and Written Opinion in PCT Application PCT/US2013/077339 dated Jun. 25, 2014; 12 pages.

* cited by examiner

MANAGED SOFTWARE REMEDIATION

CROSS-REFERENCE TO RELATED APPLICATIONS

This Application is a continuation of, and claims priority to, U.S. application Ser. No. 14/913,722, filed Feb. 23, 2016, entitled "Managed Software Remediation," which is a 371 of PCT International Application No. PCT/US2013/077339, filed Dec. 21, 2013, entitled "MANAGED SOFTWARE REMEDIATION," which claims priority to Indian Provisional Patent Applications 4389/CHE/2013, filed Sep. 27, 2013, and 4384/CHE/2013, filed Sep. 27, 2013. The disclosure of each prior application is considered part of (and is incorporated by reference in) the disclosure of this application.

FIELD OF THE DISCLOSURE

This application relates to the field of software security, and more particularly to a system for managed software remediation.

BACKGROUND

Software, binaries, executables, advertising, web pages, documents, macros, executable objects, and other data provided to users (collectively "applications") may include security flaws and privacy leaks that are subject to exploitation by malware. As used throughout this specification, malicious software ("malware") is expressly defined as a virus, Trojan, zombie, rootkit, backdoor, worm, spyware, adware, ransomware, dialer, payload, malicious browser helper object, cookie, logger, or similar application or part of an application designed to take a potentially-unwanted action, including by way of non-limiting example data destruction, covert data collection, covert communication, browser hijacking, network proxy hijacking or redirection, covert tracking, data logging, keylogging, excessive or deliberate barriers to removal, contact harvesting, unwanted use of premium services, and unauthorized self-propagation. In some cases, malware may also include legitimate software that includes inadvertent security flaws that cause or enable malware behavior. Also included in the class of security or privacy threats is "grayware," which is a less-serious form of malware, such as a semi-legitimate application, including legitimate functionality, but also including behavior that is annoying, somewhat-harmful, or undesirable (including for example collecting private data or covert use of premium services), but that is nevertheless not as severe as pure malware. Often, grayware fails to disclose to the user the full extent of its collection activities or surreptitiously goes beyond its stated functionality. In this specification, it is intended for the term "malware" to encompass both pure malware and grayware. "Malware behavior" is defined as any behavior that qualifies an application as malware or grayware. Some prior art systems are configured to identify and block malware, for example by maintaining databases of known malware.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Summary

Figure 1:
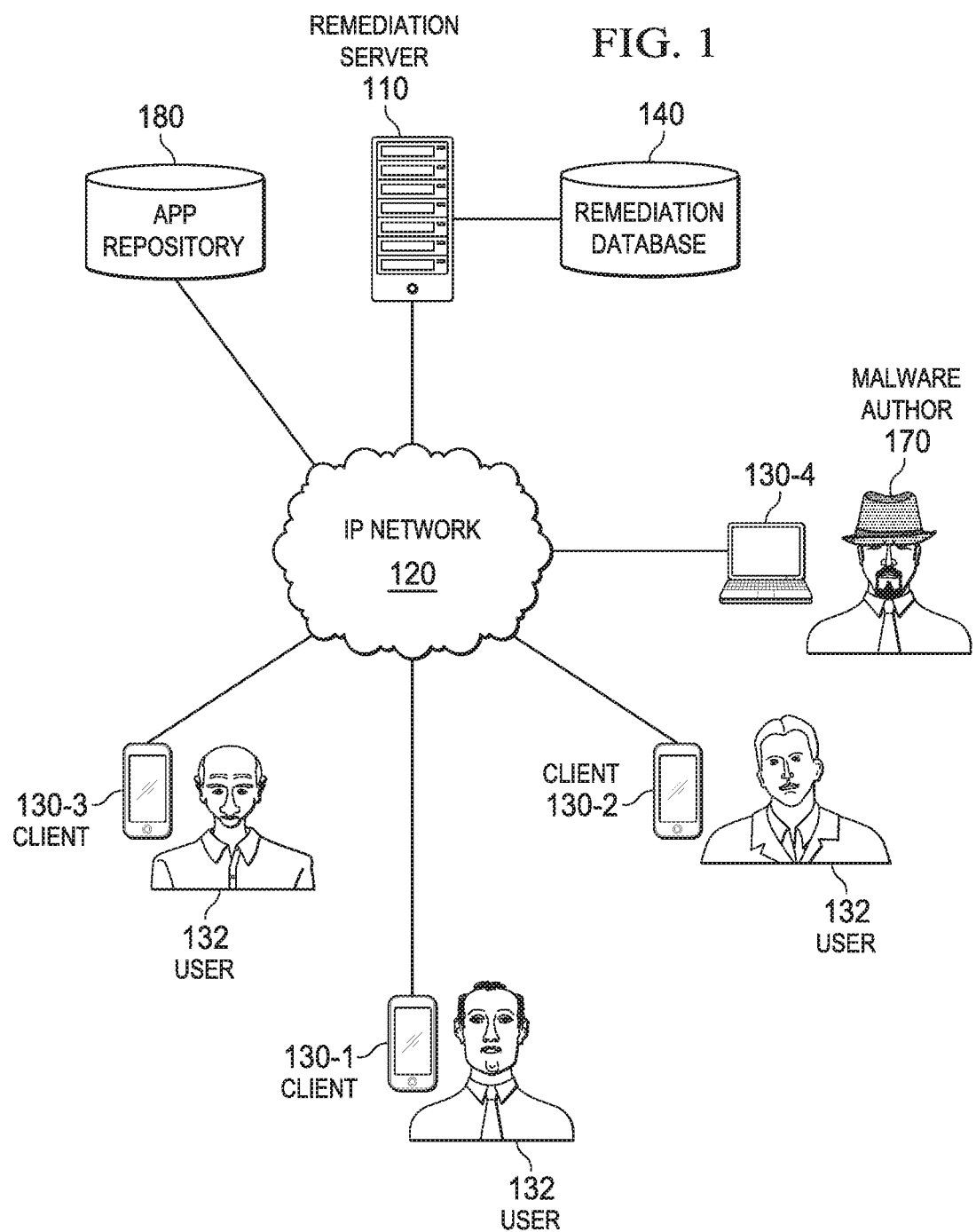
FIG. 1 is a network-level diagram of a distributed remediation environment according to one or more examples of the present specification.

In an example, there is disclosed a remediation server comprising: a hardware platform, comprising a processor, a memory, and a network interface; and instructions encoded within the memory to instruct the processor to: receive an application binary; create an application logic model of the application binary; and create personalization rules for the application binary based on the application logic model.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments many have different advantages, and no particular advantage is necessarily required of any embodiment.

Many software ecosystems are moving from the model of a user freely locating, selecting, downloading, and installing software to tightly-managed application repositories. Such a distribution model has been used for several years in Unix-like operating environments with repositories containing thousands of applications each. Mobile devices and even some desktop systems have now begun to adopt this model, and some use the "app store" as the exclusive channel for providing applications absent "jailbreaking" or similar non-trivial user intervention. The number of applications in the Android and iOS app stores, currently two of the most popular, is approaching one million each.

The app store model presents new challenges to anti-malware vendors. With a tightly-controlled app store, pure malware with solely malicious intent may be of less concern in some cases than grayware that requests too many privileges on the user's device and that may monetize via collecting private user data, spamming contacts, sending unwanted short messaging service (SMS) messages, accessing the internet, accessing internet, call, and SMS logs, targeting advertisement, or uploading data for targeted advertisements. Advantageously, the system and method of the present specification provides tools to aid a user in minimizing such malware behavior in grayware applications.

The mobile application environment may provide users with basic information on which permissions or privileges an application requests, including access to private data. In many cases, a user's only visible option is to either grant the application all requested privileges or to not install the application. In some cases, however, this information may not be sufficient to protect the user from undesirable or semi-desirable behavior. For example, a user may be informed at installation time that an application requires access to the internet, which may appear to be a legitimate function for the application, but the user does not know that in addition to the legitimate functionality, the application "phones home" and uploads private data for marketing purposes. On the other hand, the user may be informed that the application requests permission to send and receive short messaging service (SMS) messages, and even though the user does not see why a game, for example, requires access to SMS, the user may not have the technical background to know which applications legitimately require which permissions, or whether the applications go beyond legitimate uses for necessary permissions. For example, if an application has access to the user's contacts, it may use that access to do useful and desirable things to benefit the user, or it may collect all of the user's contacts and forward them to the application author's server for the author's own pecuniary purposes, either through direct targeted advertising or through selling those contacts to targeted advertisers. And if the user does decide that the game does not have a legitimate need for SMS privileges, the user may not have an option to selectively block only SMS because some operating environments provide only a "take it or leave it" approach: either grant the application all of the permissions it is requesting, or do not install it.

Thus, users may not know until after using an application whether its function is truly beneficial. By that time, the damage may already be done. Thus, it is beneficial to provide in advance an understandable and actionable model of what an application does, and to provide tools to aid the user in eliminating undesirable malware behavior while retaining the desirable functionality of the application.

According to one example, the system of the present specification provides a method and framework to a) detect the actual behavior of an application that could potentially harm the user such as in privacy leakage or other malware behavior and b) remedy undesirable behavior during run time without modifying application binaries. The user may be able to modify the behavior of the application to personalize it to the user's preferences. The behavior control may be application-specific, configured at installation time or dynamically controlled while the application is running, based on user input. In another example, undesirable behavior is "healed" by modifying the application binary to eliminate malware behavior.

One principle behind this embodiment is deep static analysis of the executable, thereby providing users a human-readable and actionable report of application behavior. The analyzer may perform deep inter-procedural analysis with respect to the way the application uses privileged access to private data.

The behavioral report may then be used to configure dynamic personalization of the application. Finally, the system may intercept malware behavior of the application at run-time and allow the user to control and personalize the behavior by either blocking the undesirable behavior or accepting the behavior.

According to an example, the present specification also provides a remediation engine that intercepts application installation and analyzes binary or byte code data to detect potential malware behavior.

According to another example, the system of the present specification may identify the published intent of an application based on name and feature description, for example. The system may correlate this with real behavior as determined by a remediation engine to identify any gap between claimed behavior and real behavior. The system may then assign a rating and categorize the application as grayware or malware based on the gap.

FIG. 1 is a network-level diagram of a distributed remediation environment according to one or more examples of the present specification. In this example, a plurality of users 132 operate a plurality of client devices 130. Each client device may be connected to an IP network 120, such as the internet, an intranet, WAN, LAN, corporate network, secured network, or similar.

Malware author 170 also connects to IP network 120 via a client device 130. Throughout this specification, malware author 170 is shown to have produced an Android-based application called "racinggame.apk." In this example, racinggame.apk provides a popular and entertaining racing game for Android smart phones and tablets. Racinggame.apk may also engage in certain malware behavior, such as collecting user 132's personal, location, or contact data, spamming user 132's contacts, or otherwise attempting to monetize user 132.

An app store 180 is provided and is communicatively coupled to IP network 120. In an example, malware author 170 uploads racinggame.apk to app repository 180 via IP network 120. A remediation server 110 connects to IP network 120 and is communicatively coupled to a remediation database 140. Remediation database 140 may be configured to include stored data and procedures relating to applications that remediation server 110 has previously analyzed, including actionable descriptions of application behaviors and recommended remedial actions if any. Remediation database 110 may include, or may be connected to a reputation database configured to provide a reputation score for applications as part of the data needed by remediation database 14. In this embodiment, remediation database 140 is disclosed as being directly connected to remediation server 110, but it will be appreciated that other configurations are possible, including that remediation database 140 may be provided by a third party and may be accessible for example via an application programming interface (API). Initially, remediation database 140 has no reputation data or remedial procedures defined for racinggame.apk.

In an example, users 132 operate client devices 130. A "client device" is expressly defined as any type of node or user device, including by way of non-limiting example a computer, a personal digital assistant (PDA), a laptop or electronic notebook, a cellular telephone, an IP telephone, an iPhone™, an iPad™, a Microsoft Surface™, an Android™ phone, a Google Nexus™, or any other device, component, element, or object capable of executing instructions and interfacing with a user. A "user" is expressly defined as a person, entity, or device capable of operating, using, or otherwise interfacing with a client device. In some cases, it may be beneficial to have a plurality of remediation servers 110, or to configure remediation server 110 to separately handle a plurality of species of client devices 130. For example, malware payload executable on Microsoft Windows 7 may not be executable on any of the other devices listed above. Rather, malware payloads may need to be crafted to specifically target specific architectures. This specification expressly anticipates, however, a situation where a single malware payload may be targeted to a plurality of client device 130 platforms. For example, the malware payload may be implementable in a cross-platform language such as Java, and may be able to exploit a security weakness common to a plurality of platforms.

In an example, user 132-1 operates client device 130-1, which may be an Android phone. In this example, a large plurality of other users may also operate similarly-configured Android phones, and have access to app store 180, from which they receive executable objects. Malware author 170 may want to create malware targeted for Android phones, including semi-legitimate apps, and may do so by one of the example method mentioned above, or by any other suitable method.

Remediation server 110 may be operated, for example, by the operator of app store 180, or by a third-party security provider. Further, remediation database 140 may be operated by the operator of remediation server 110, or may be provided by a third party. In general terms, the entities disclosed in this specification may or may not be separate entities depending on the specific configuration.

Remediation server 110 may be configured to provide remedial data or methods for applications distributed via app store 180, or for other applications. "Remediation" is expressly defined in this specification as actions, data, modifications, procedures, or other similar steps taken to effectively prevent, block, reduce, ameliorate, or modify malware behavior in an application. The term may also be used throughout this specification as a verb "remedy" or as an adjective "remedial."

Figure 2:
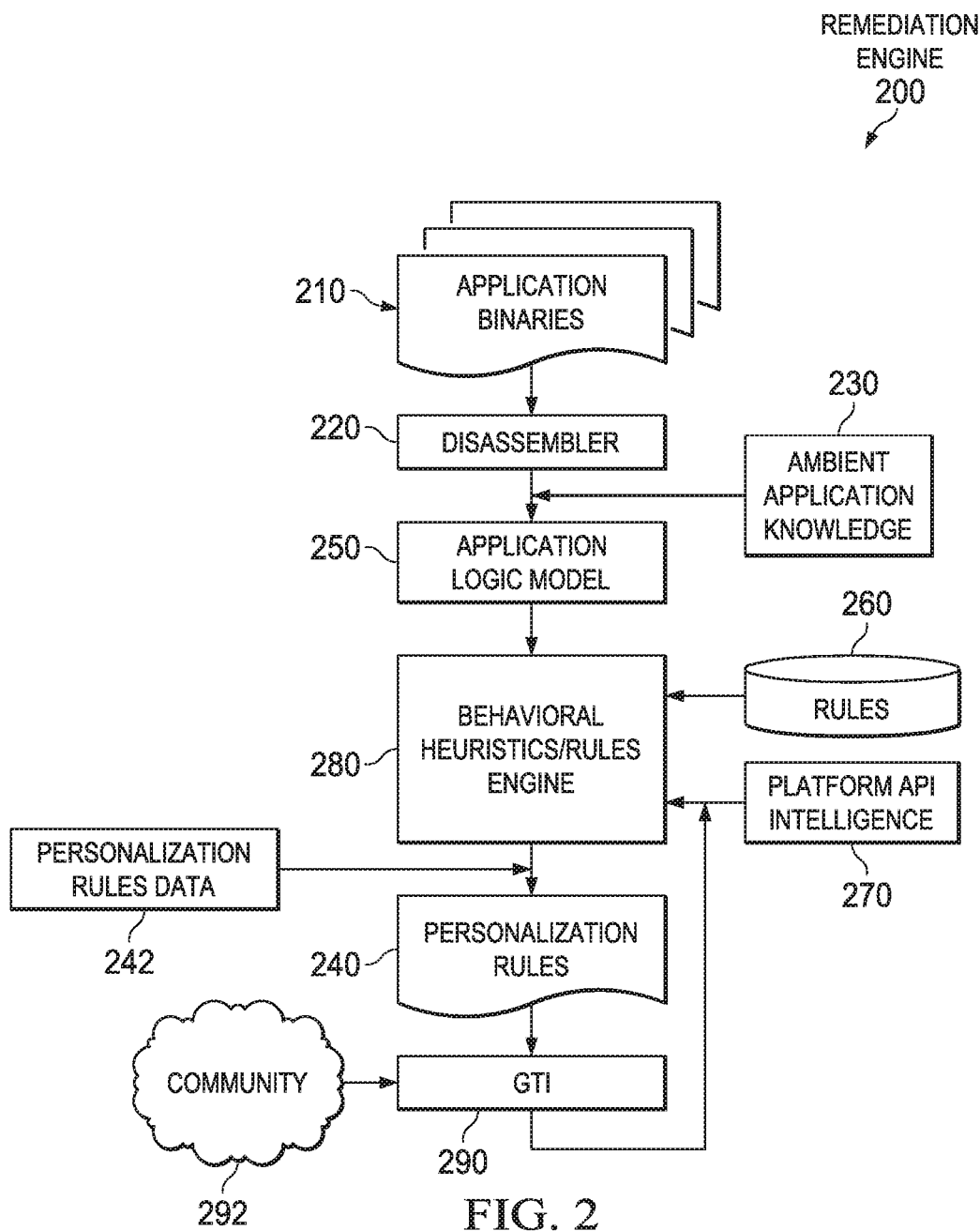
FIG. 2 is a functional block diagram of a remediation engine according to one or more examples of the present specification.

FIG. 2 is a functional block diagram of a remediation engine 200 according to one or more examples of the present specification. In an example, remediation engine 200 may be software included either in remediation server 110 or client device 130. In one example, both remediation server 110 and client device 130 include a species of remediation engine. For example, client device 130 may perform a "quick" scan optimized to conserve battery power and sparse processing resources on a mobile device while still providing a degree of confidence. The application binary may then be delivered to remediation server 110 for more detailed analysis. In one example, remediation engine 200 prevents the application binary from running on client device until the "quick" scan is complete. In another example, remediation engine 200 prevents the application binary from running on client device until the full scan is completed on remediation server 110.

Disassembler 220 receives application binaries 210, such as racinggame.apk, and constructs a model of program logic, for example from the byte code. Application binaries may also include assembly instructions, scripts, macros, and other executable objects by way of non-limiting example. Disassembler 220 also analyzes ambient application knowledge 230, including for example, available descriptions, comments, strings, or other descriptive material that may be useful in guiding or supplementing the disassembly process. This results in application logic model (ALM) 250, which is provided to a behavioral heuristics and rules engine (BHRE) 280. In an example, an input to building program logic is a database that encodes the semantics of Application Programming Interface calls in the host operating system. The encoding may capture, for example, inputs, outputs, description of the functionality of the API, and information sensitivity of data the API handles.

ALM 250 may model application logic in memory to identify malicious behavior, for example by stepping through the model. ALM 250 may include data flow structures and control flow structures.

Data flow structures may represent the lifetime of data objects as they pass through the program logic from the point they are defined to all the places they are used passing through different modules of the same program unit as well as external program units. Data flow structure may identify the flow of data from different parts of the program as it moves and transforms, to identify where it is going. For example, a "calendar" or "contacts" data flow may be configured to deduce whether data are being leaked out to an internet address. Sensitive calls may also be traceable back to a user interface element, interaction, or background process that initiated them.

ALM 250 may include rules for performing a data flow analysis. Rules engine 260 applies the rules to ALM 250 and identifies the potentially malicious behavior. An example rule may be represented as follows.

<Rule>
  <Run><Dataflow><ReadOperation> of <red subsystem>
    to a <WriteOperation> of <any subsystem>

In one example, rules provide a declarative specification to BHRE 280 on behaviors that are deemed questionable by remediation engine 230. BHRE 280 may attempt to verify the existence of such behaviors in application binaries 210. When no rules are specified in database 260, BHRE 280 may assume a set of default rules, which may be internal to BHRE 280, with the objective to encode typical objectionable behaviors of malware. This may also allow remediation engine 200 to adapt to evolving malware, as BHRE 280 can encode new rules as malware behavior changes and evolves.

In some embodiments, it is desirable for remediation engine 200 to evolve over time as malware evolves. Rules database 260 provides a means to accomplish such evolution. In some cases, rules may not be limited to specifying the so-called "grayware" or "blackware" patterns. Rather, rules may specify application behaviors that are undesirable from an enterprise perspective. For example, an enterprise may choose to restrict applications from accessing cameras for security concerns.

In this case, the rule specifies that any data flow of a read operation from a subsystem with "red" security sensitivity to a write operation of any subsystem matches the rule. The rules may be generic like the one above or may be specific to subsystems, for example a special rule may be configured expressly for detecting data leaks of contacts. A specific behavior can be derived by running a single rule or a multiple rules and then processing the results.

In another example, rules engine 260 may link data flow representations of two different applications that work together to achieve a task. Rules engine 260 may whitelist common applications that are used by other applications to achieve a useful function. For example, it may whitelist a contacts app used by other apps to legitimately gain access to the contacts.

Heuristic behavior may both inform and be informed by personalization rules 240, which may be a set of structured rules or directives on personalizing an application, including blocking or restricting malware behavior. Similarly, rules database 260 may provide rules to BHRE 280 and receive updates from BHRE 280. Rules database 260 may include, for example, a database of previously-defined rules, and may be useful in defining rules for known subroutines or behaviors. Personalization rules 240 may also receive personalization rules data 242.

In general, personalization rules 240 may derive rules from two sources. First, rules may be derived from personalization rules data 242, which may be provided by user preferences are input. Personalization rules 240 may also derive rules from behaviors that are discovered by analysis.

BHRE 280 may include rules that enable recognition of definite sequences of code as performing a given function, or that enable it to recognize that certain sequences of behavior are usually associated with a given action. Pseudocode for an example method performed by BHRE 280 may include the following, by way of non-limiting example:

```
StartAnalysis( )
For Each Rule rule from ListOfRules
    Get RuleBegingingCondition ruleBeginningCondition from
rule
        For Each DefinitionInstruction instr_Def
            IF typeOf(instr_Def) matches
ruleBeginningCondition
TryMatchingRules(instr_Def, rule)
TryMatchingRules(DefinitionInstruction instr_Def, Rule rule)
        //Start iterating through the use-list
For Each UseInstruction instr_Use from List of use
instructions in instr_Def
IF typeOf(instr_Use) matches Termination_Condition_Of rule
Rule satisfied;
break;
            ELSE
IF typeOf(instr_Use) matches one of the
Intermediate_Condition_Of rule
TryMatchingRules(instr_Use, rule)
            ELSE
IF typeOf(Instr_Use) matches
InterApp_Communication_Condition_Of rule
Start from beginning for peer app where instr_Def is the
instruction which uses the data from instr_Use.
```

By way of further example, pseudocode of [definition-use?] creation includes the following:

```
FOR EACH Dalvik Instruction Instr_Dalvik
    Delegate Instr_Dalvik to appropriate InstructionHandler
        IF Instr_Dalvik creates a register Reg_Def
    Create a DefUseRow object DefInstr for register Reg_Def
        ELSE
        IF Instr_Dalvik uses register(s)
            FOR EACH used register Reg_Use
                Iterate through the DefUseRows in the
Method
                FOR EACH definition object DefUseRow
                IF def-register of DefUseRow == Reg
                    Add Instr_Dalvik in the use list
of DefUseRow
                    IF Instr_Dalvik is a method call
in the app
Add method prototype as key and DefUseRow as value in
HashTable BrokenParamDefCol
            IF Instr_Dalvik uses parameter register
                THEN
                Iterate through the Hashtable
BrokenParamDefCol
                    FOR EACH Row in BrokenParamDefCol
                    IF Row.Key ==
Instr_Dalvik.MethodPrototype
AND
                    IF Row.Value.Register ==
Instr_Dalvik.Register_Number
                        Add Instr_Dalvik in the use list
of Row.Value
```

Also shown in this embodiment are platform API intelligence 270 and global threat intelligence (GTI) 290.

As described herein, GTI may be an external intelligence database that provides intelligence of whitelists, blacklist based on community inputs, manual inspection, historical data and reputation by way of non-limiting example. In some cases, GTI 290 may provide malware designations at the application binary level, or may provide a finer-grained designation such as designating certain subroutines as known malware. Designation of malware at the subroutine level may be particularly useful in identifying grayware, as it may reside in otherwise-legitimate applications. GTI 290 may also receive updates or contributions from BHRE 280, or more broadly from remediation engine 200.

BHRE 280, personalization rules 240, and personalization engine 780 (FIG. 7) provide valuable information on the behavior of the application. The information may include, by way of non-limiting example:

a. behaviors that the analyzer discovers that the application is likely to exhibit based on programmatic analysis;

b. crowd-source personalizations for a named application;

c. behaviors that the application exhibits at run time and when personalization is activated.

This information may be provided to GTI 290, so that the remediation server 110 knows both static and dynamic behaviors of specific applications according to community inputs, as well as prevailing preferences of the user community for the behaviors exhibited for specific applications. This knowledge may be continuously accrued by "crowd sourcing," and used to provide an improved user experience.

Platform API intelligence 270 may be a database with intelligence concerning application programming interfaces (APIs) for the platform, which in this example is Android, but which may be any other suitable platform. In an example, platform API intelligence 270 includes a representation of platform API semantics in extensible markup language (XML) or another suitable modeling language. This may enable BHRE 280 to determine the importance or sensitivity of specific APIs, along with detailed information about inputs and outputs of certain API elements, including subroutines. Those behaviors may optionally be combined with user inputs and translated into a control configuration. BHRE 280 may then modify the binary, or insert control hooks to intercept certain API calls to control the behavior of application binary 210.

There is also disclosed herein with respect to platform API intelligence 270, a method to represent key semantics of platform APIs so that remediation engine 200 may more effectively determine what an application is doing.

In an example, available APIs may be represented in an XML format as follows.

```
<APIName: name>
    <Category: read/write/process/transform/.../...>
        <CategoryDetail>
            <Reads: sensitivity>
            <Writes: sensitivity>
            <Transform: sensitivity>
        <Senitivity: red:5/orange:4/yellow:3/green:1>
        <Parameters: No of paramerer><There should be a possible
values section too>
            <ParameterIndex:Index>
                <Type: integer/object/string/../..>
                <Operation: input/output/transformative>
        <return value: void/integer/object/string/>
    <Description>
        <APIDescription: description of the API>
        <Verbs:xxx>
        <Nouns:xxx>
```

The object "APIName" provides a name for the API being referenced. The object "Category" indicates a type of API, such as whether it reads information from the system, has read or write disk access, or provides a message box for example.

The object "Sensitivity" represents the sensitivity of the API in the context of potential for malware behavior. For example, whether it reads locations that contain potentially private information, or whether it has access to resources such as contacts, location, SMS, phone, e-mail, or the internet. In an example, sensitivity may be assigned a numerical value, such as 1 to 5, or a color value, such as red for the most sensitive objects, orange for less sensitive objects, yellow for slightly sensitive objects, and green for objects with little or no sensitivity issues. Factors that contribute to a weighted sensitivity may include privacy, data leak potential, and financial sensitivity by way of non-limiting example.

In an example, the parameters to the API call may also be listed and described. A return value may also be provided, along with descriptive keywords, which may be divided into nouns and verbs.

In this example, remediation engine 200 is disclosed as a monolithic and highly-integrated engine, but it should be appreciated that other configurations are possible, and that in a broader sense, any of the logical blocks disclosed herein could be provided by a third party, for example via an API, or through other means. Furthermore, even within an integrated enterprise, the different logical blocks disclosed herein may be performed by separate machines running separate services. Thus, it should be appreciated that the logical block diagram of FIG. 2 is provided primarily as an example of the logic elements found in an example remediation engine 200 and are not intended to imply or require a particular physical arrangement.

According to one non-limiting example, personalization rules 240 may include rules for personalizing one or more applications. Personalization rules may be provided as structured XML or in any other suitable format, as follows:

```
<?xml version="1.0" encoding="utf-8"?>
<Policies>
<PackageName Name="com.software.racinggame">
    <Behavior Type="PremiumSMS">
        <Policy DestinationStatus="Harmful"
Action="StopAndNotify">
            <Destination>3855</Destination>
            <Destination>2855</Destination>
            <!-- And so on -->
        </Policy>
        <Policy DestinationStatus="Harmless"
Action="ProceedAndNotify">
            <Destination>7151</Destination>
            <Destination>8151</Destination>
            <Destination>40659</Destination>
            <!-- And so on -->
        </Policy>
        <!-- At this point, Unknown may not seem to be required
here but, we keep it in case we want to configure the actions
for different applications-->
        <Policy DestinationStatus="Unknown"
Action="AskTheUser"/>
    </Behavior>
</PackageName>
<PackageName Name="walkingtexter">
<Behavior Type="LocationLeak">
        <Policy DestinationStatus="Harmful"
Action="StopAndNotify">
<Destination>http://incorporatedapplications.com/wat.php</Destination>
<Destination>http://whoaddedthis.com/wat.php</Destination>
            <!-- And so on -->
        </Policy>
        <Policy DestinationStatus="Harmless"
Action="ProceedAndNotify"/>
        <Policy DestinationStatus="Unknown"
Action="AskTheUser"/>
    </Behavior>
    <Behavior Type="ContactsLeak">
        <Policy DestinationStatus="Harmful"
Action="StopAndNotify">
<Destination>http://incorporatedapplications.com/wat.php</Destination>
            <!-- And so on -->
        </Policy>
        <Policy DestinationStatus="Harmless"
Action="ProceedAndNotify"/>
        <Policy DestinationStatus="Unknown"
Action="AskTheUser"/>
    </Behavior>
    <Behavior Type="IMEILeak">
        <Policy DestinationStatus="Harmful"
Action="StopAndNotify">
<Destination>http://incorporatedapplications.com/wat.php</Destination>
            <!-- And so on -->
        </Policy>
        <Policy DestinationStatus="Harmless"
Action="ProceedAndNotify"/>
        <Policy DestinationStatus="Unknown"
Action="AskTheUser"/>
    </Behavior>
</PackageName>
</Policies>
```

In the foregoing application, the XML object "Policies" indicates that the object includes policies for one or more applications such as racinggame.apk, each identified by a "PackageName" object, such as "com.software.racinggame" and "walkingtexter" in this example. Each package includes one or more policies, identified by "Policy" objects, which identify a "Behavior" (such as SMS leak, international mobile equipment identity (IMEI) leak, contacts leak, location leak, or similar). A policy may also include a "Destination" object, indicating for example where leaked information is delivered to, as well as a "DestinationStatus," which may contain a reputation for the destination. For example, if the destination is a known malware author, the destination status may be designated "Harmful," whereas if the destination is legitimate, the status may be "Harmless." For unknown destinations, the status may be "Unknown." Numerous other grades and variations of destinations are also possible, including for example "Grayware," "Suspect," "Adware," or other similar designations.

Finally, an "Action" field is provided to instruct a device, such as a client device 130 running remediation client software 322 (FIG. 3) what action to take in response to specific behaviors for the application. For example, "StopAndNotify" instructs remediation client software 322 to block the behavior and notify the user of the attempted malware behavior. "ProceedAndNotify" may instead instruct remediation client software 322 to allow the behavior to proceed but also notify the user, including in some embodiments giving the user an interactive option to block future behaviors of the same type from the package. Many other types of actions are available for this object, including simple "Stop" and "Proceed" directives, and directives to take other remedial actions such as simulating an input (including providing simulated GPS coordinates, simulated contacts, or simulated network traffic), or directives to modify a subroutine to alter undesirable behavior.

In an example, remediation engine 200 provides a closed-loop analysis, from on-device analysis with remediation engine 200 providing updates to GTI 290, which in turn provides data to remediation engine 200.

Figure 3:
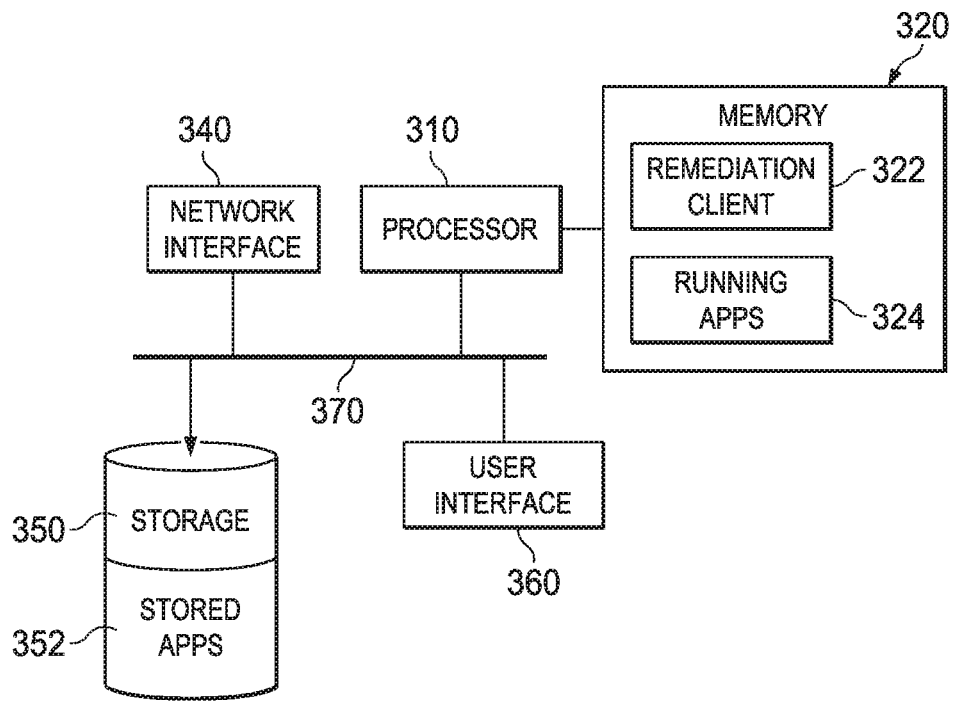
FIG. 3 is a block diagram of a client device according to one or more examples of the present specification.

FIG. 3 is a block diagram of a client device 130 according to one or more examples of the present specification. Client device 130 is controlled by a processor 310, which is communicatively coupled to a memory element 320. In an example, processor 310 is communicatively coupled to other system elements via bus 370. Those elements may include, by way of non-limiting example, a network interface 340, and storage 350, which in some cases may be a species of memory element 320, and a user interface 360. It is expressly intended that any of the above elements can be realized in hardware, software, firmware, or any combination thereof.

Processor 310 is configured to control client device 130, for example via executable software or firmware instructions. A "processor" is expressly defined herein as any combination of hardware, software, or firmware providing programmable logic, including by way of non-limiting example a microprocessor, digital signal processor, field-programmable gate array, programmable logic array, application-specific integrated circuit, or virtual machine processor.

Memory 320 may be a relatively low-latency volatile memory in some embodiments, and may include main memory, cache, on-chip memory, L1 memory, L2 memory, or similar. Note that in this embodiment, processor 310 is depicted in a direct memory access arrangement with memory 320, but in other embodiment, memory 320 may communicate with processor 310 via system bus 370, via some other bus, or via some other means. Furthermore, although memory 320 and storage 350 are depicted in this example as physically or conceptually separate devices, it should be appreciated that in some embodiments, memory 320 and storage 350 may share a physical device, which may or may not be divided into separate memory area. Thus, it should be appreciated that the arrangement disclosed here is an example only, and not limiting. Rather, it is expressly intended that even where a memory and storage are spoken of separately, they may be embodied in a single physical or logical device unless expressly stated otherwise.

In this example, network interface 340 includes any communication medium, whether analog, digital, or mixed-signal, that is configured to communicatively couple client device 130 to other computing devices. Network interface 130 may include, by way of non-limiting example, a WiFi, Ethernet, Firewire, fiberoptic, USB, serial interface, cellular network, digital PCS networks, 2G data network, 3G data network, 4G WiMAX, or 4G LTE data networks. In contrast, WiFi driver 980 is disclosed as a species of high-bandwidth data network.

User interface 360 is expressly defined as any combination of hardware, software, and firmware configured to enable a user to interact with client device 130, whether or not in real-time. In the example, user interface 360 may include, by way of non-limiting example, a keyboard, mouse, display monitor, speaker, microphone, touch-sensitive display, which may act as a combined input/output device, and a camera. User interface 360 may include software services such as a graphical user interface, including real-time dialog boxes that solicit input or confirmation from a user.

Storage 350 is disclosed as an example of a non-volatile memory medium, which may be a species of memory 320. In some embodiments, memory 320 and storage 350 may be separate devices, with memory 320 being a relatively low-latency volatile memory device, and storage 350 being a relatively high-latency non-volatile memory device. Storage 350 may also be another device, such as a hard drive, solid-state drive, external storage, redundant array of independent disks (RAID), network-attached storage, optical storage, tape drive, backup system, or any combination of the foregoing. Many other configurations are also possible, and are intended to be encompassed within the broad scope of this specification.

In some examples, storage 350 may be a tangible, non-volatile storage medium having stored thereon executable instructions operable to provide a remediation engine 200 or an appropriate part thereof, along with other aspects of a remediation client. In operation those instructions may run from memory 320. Memory 320 may also have other applications or executable objects in a state of execution, such as running apps 324. Storage 350 may also include executable objects, which may be in a dormant or static state. Remediation client 322 may be configured to operate on both running apps 324 and stored apps 352 according to methods disclosed herein. In some embodiments, remediation engine 200 is a subroutine of remediation client 322.

Figure 4:
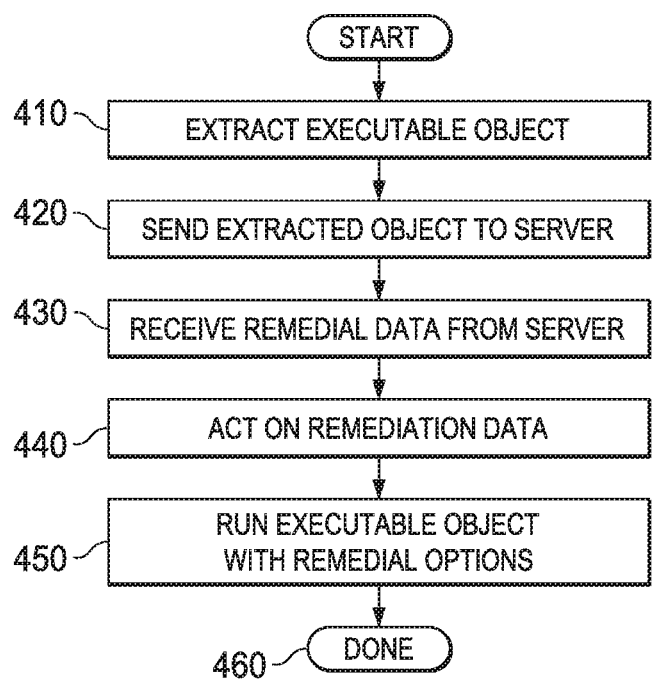
FIG. 4 is a flow chart of a remediation client software according to one or more examples of the present specification.

FIG. 4 is a flow chart of a remediation client software according to one or more examples of the present specification. In block 410, remediation client 322 extracts an application, such as for example identifying "racing-game.apk" as an application requiring remedial analysis. Extracting may include simply identifying the application, or may include extracting a portion of interest for analysis. In block 420, remediation client 322 sends the extracted object to remediation server 110.

In block 430, remediation client 322 receives remedial data back from remediation server 110. This may include, for example, a modified binary with built-in remedial behavior, or it may include directives for remediating application behavior. For example, remediation server 110 may send an XML file including remedial directives, as disclosed in connection with FIG. 2.

In block 440, client device 130 acts on remedial data received from remediation server 110. In some cases, the action may be simply replacing the original application binary with a modified application binary provided by remediation server 110. In another example, acting on remedial data comprises configuring remediation client 322 to take specified action in conjunction with operation of the application binary, such as providing simulated data or selectively denying certain privileges. For example, if racinggame.apk is found to spam SMS contacts, remediation client software 322 may selectively revoke its SMS permissions, but allow it all other permissions. If, on the other hand, racinggame.apk requires access to SMS for some legitimate functions but abuses its SMS privileges by sending spam SMS messages, then operating system hooks may be inserted to selectively block only certain subroutines from SMS, or a firewall rule or similar may be provided to either block racinggame.apk from sending SMS to specified addresses (blacklisting), or to allow racinggame.apk to send SMS only specified addresses (whitelisting). These are provided by way of example only, and it should be noted that many other actions may be taken in response to receiving remedial data from remediation server 110.

In block 450, the application is run with remedial options. This may comprise simply running the modified binary in one example. In another example, this may comprise running the application binary with modified permissions. In yet another example, this may comprise running remediation client software 322 as a background process to selectively modify the behavior of the application binary in real time.

Figure 5:
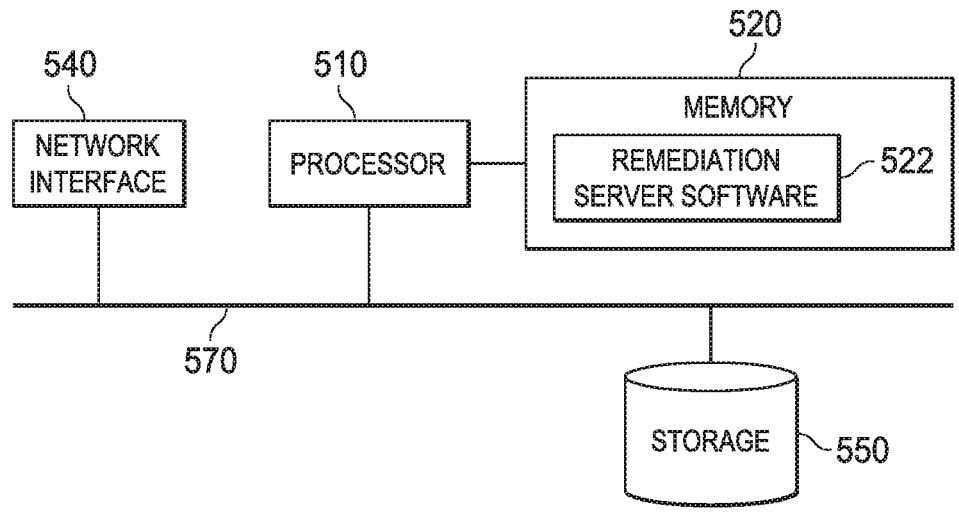
FIG. 5 is a block diagram of remediation server according to one or more examples of the present specification.

FIG. 5 is a block diagram of remediation server 110 according to one or more examples of the present specification. In this example, remediation server 110 is controlled by a processor 510. A memory 520 is communicatively coupled to processor 510. Other system components of remediation server 110 connect to processor 510 via system bus 570. Remediation server 110 may also include a storage 550 and network interface 540. Processor 510 may be similar to processor 310 of FIG. 3. Likewise, memory 520 may be similar to memory 320, storage 550 may be similar to storage 350, and network interface 540 may be similar to network interface 340.

In this example, network interface 540 may be configured to communicatively couple remediation server 110 to IP network 120. In some cases, storage 550 may include remediation database 140, while in other cases remediation database 140 may be provided separately.

Memory 520 may have stored therein remediation server software 522, which may include for example executable code and data operable to provide remediation server functionality as described herein. In some examples, memory 520 may include executable software instructions operable to provide remediation engine 200. Storage 550 may be a non-volatile tangible storage medium including a stored copy of software instructions operable to provide remediation engine 200.

Figure 6:
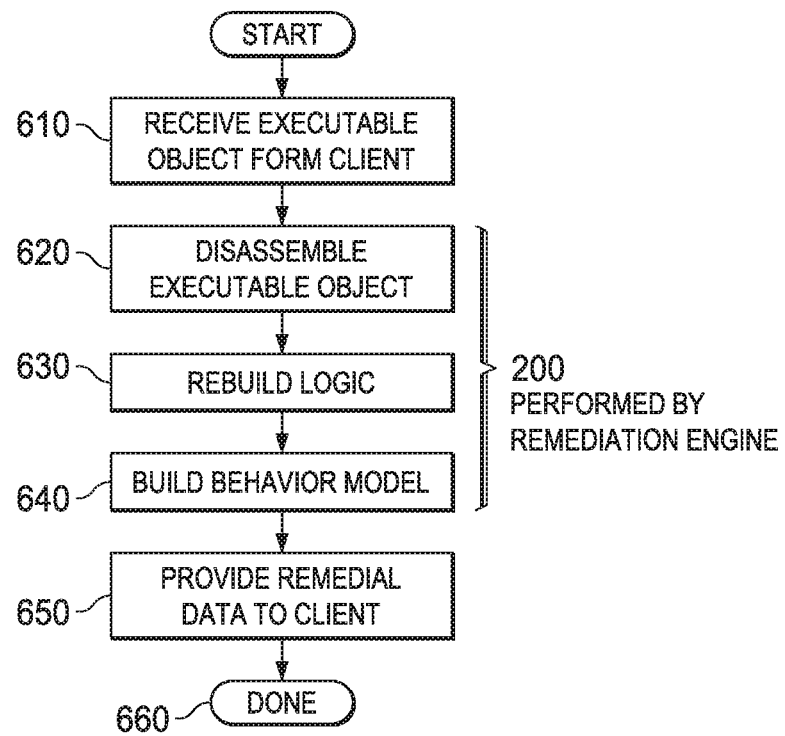
FIG. 6 is a flow chart of a method of providing a remediation server software according to one or more examples of the present specification.

FIG. 6 is a flow chart of a method of providing a remediation server software 522 according to one or more examples of the present specification. In block 610, remediation server 110 receives for analysis and possible remediation an executable object, such as an application binary, from client device 130.

Blocks 620, 630, and 640 represent operations that, in some embodiments, are carried out by remediation engine 200. In block 620, remediation engine 200 disassembles the executable object to identify potentially harmful logic, subroutines, or behavior. In block 630, remediation engine 200 rebuilds the logic in a more desirable way. In block 640, remediation engine 200 builds a behavior model, which may be structured in XML as described above. Notably, in some cases, only one of block 630 and block 640 are necessary. In this specification, when remediation engine rebuilds the actual application binary, which may include altering behavior or inserting operating system control hooks, it is referred to as "healing" the application. When remediation engine 200 instead uses external control to modify the application, it is referred to herein as "personalizing" the applications behavior. In some cases, an application may be both healed and personalized, in other cases, an application is either healed or personalized, and in yet other cases, neither is necessary.

In block 650, remediation server 110 provides remedial data to client device 130. This may include, by way of non-limiting example, sending a healed binary to client device 130, sending personalization rules 240 to client device 130, or both. In block 660, the method is done.

Figure 7:
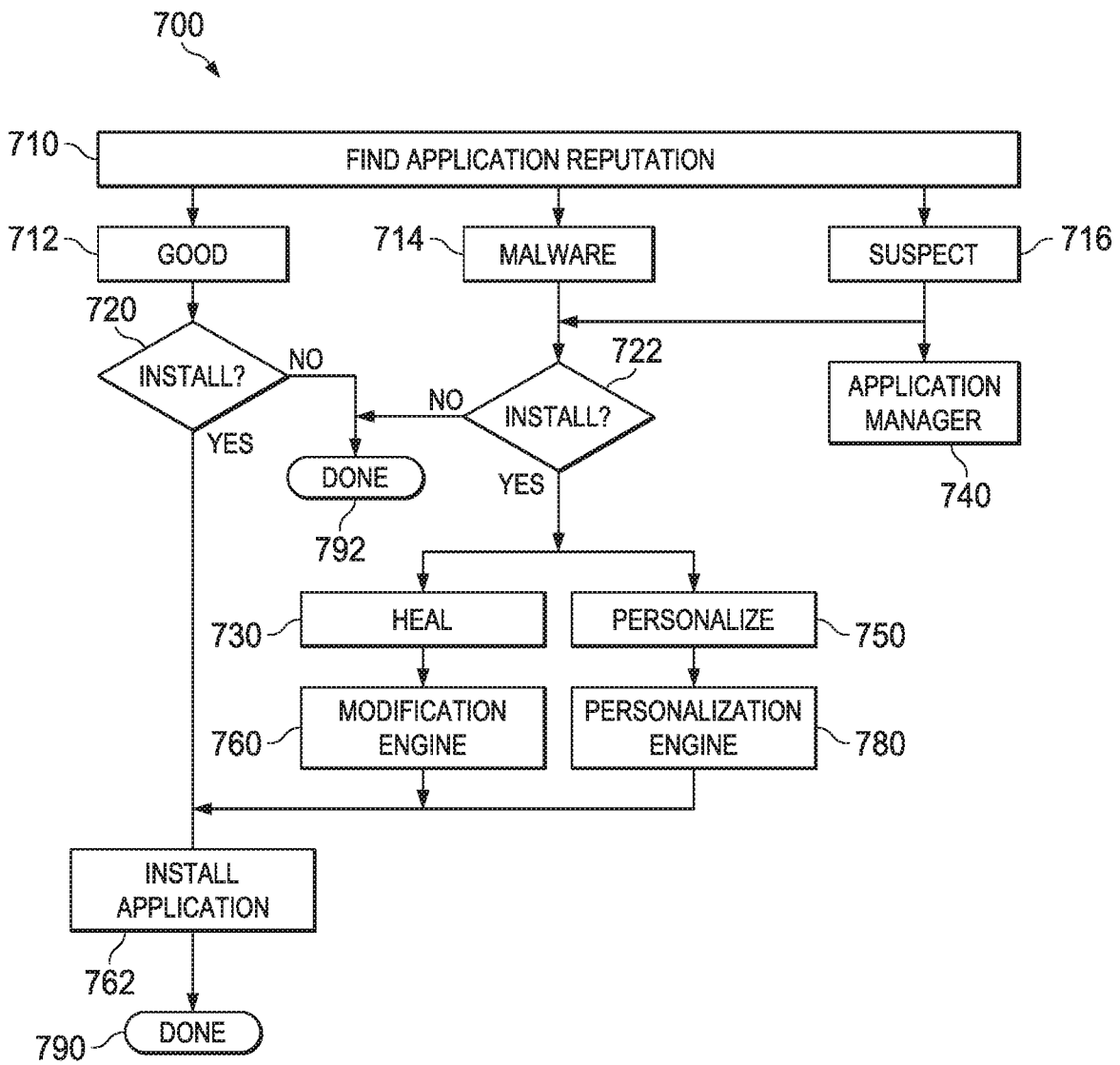
FIG. 7 is a flow diagram disclosing with more particularity a method carried out by a remediation engine according to one or more examples of the present specification.

FIG. 7 is a flow diagram disclosing with more particularity a method 700 carried out by remediation engine 200 according to one or more examples of the present specification. In method 700, at block 710 remediation engine 200 queries a reputation database, which may be included in remediation database 140, to determine whether the application binary, such as racinggame.apk, has an existing reputation.

By way of example, three possible reputations are provided: in block 712, racinggame.apk may have a reputation as a "Good" application, meaning that it exhibits no malware behavior. In block 714, at the other extreme, racinggame.apk may be known malware. As an intermediate case, in block 716, racinggame.apk may be suspect. This may be the default case for any application that has not yet been analyzed and thus does not yet have a reputation. This designation may also indicate that an application includes at least some behavior that is not yet fully understood or that has not been fully remedied. In that case, control passes to an application manager 740, which may be a discrete logical block or physical device, or which may logically designate portions of remediation engine 200 that are configured to handle suspect applications. Application manager 200 may also include deep analysis, including analysis by a human operator, to more fully explore the functionality of the application binary. Block 716 may also provide a path to block 722, as described below, where the user may be presented with a description of available information about the application and presented with an opportunity to install the application.

In block 712, if an application is designated as "good," then the user may be prompted whether to install the application. Note that because existing remediation data may have already been retrieved from remediation database 140, this prompting still may involve operations from remediation client software 322. For example, the remediation data may include a plain-text description of what the application does with its requested permissions, rather than a cryptic list of permission requests without any context. Having been presented with this list, the user may then opt to either install the application or not. In block 720, if the user opts to install the application, then in block 762, the application is installed, and in block 790 the method is done.

In block 714, if the application is identified as malware, then in block 722, the user has an option of whether or not to install the application anyway. In an example, when remediation engine 322 presents the user with an option to choose whether to install the application, it may also provide a description of the known malware behavior, and proposed remedial actions, including healing the application and personalizing the application. In one example, the user may elect to simply not install the application, and in block 792, the method is done. In another example, the user elects to proceed with the installation. In that case, the user may elect a remedial option, or only one remedial option may be available, in which case that one remedial action will be taken. In block 750, if personalization is available and elected by the user, then a personalization engine 780 may personalize the application. Personalization engine 762 may be a separate logical method or device, or may be logical portions of remediation engine 200 that are configured to handle personalization. In one example, personalization engine 780 may include or receive information from personalization rules 240, and may include parts of BHRE 280.

In block 730, if healing is available and is elected by the user, then in block 760 then the application is provided to modification engine 760. Modification engine 760 may be a separate logical method or device, or may be logical portions of remediation engine 200 that are configured to handle healing. In an example, remediation engine 200 may include platform API intelligence 270, GTI 290, and parts of BHRE 280.

Proceeding from either block 760 or 782, the application, including healing and/or personalization, may be installed on client device 130. In block 790, the method is done.

Figure 8:
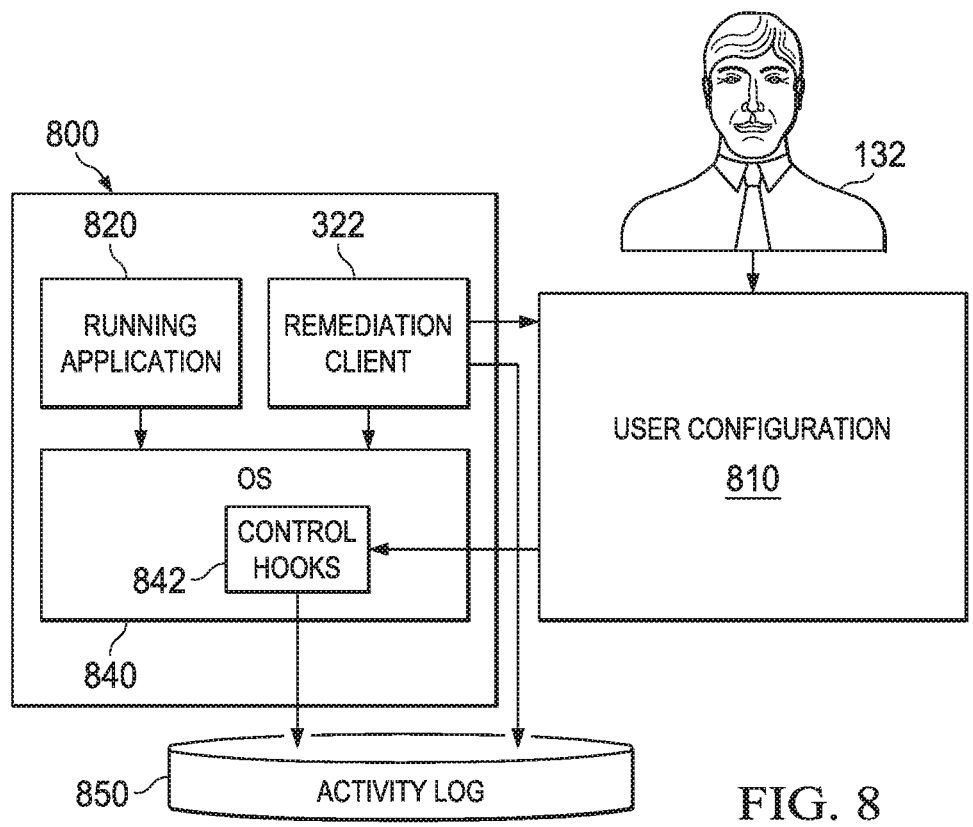
FIG. 8 is a block diagram of a remediation client software in situ with a client device according to one or more examples of the present specification.

FIG. 8 is a block diagram of a remediation client software 322 in situ with a client device 130 according to one or more examples of the present specification. In this example, user 132 provides inputs to user configuration 810, which is configured to store user preferences. User configuration 810 may include one or more of a text file, binary file, or registry setting by way of non-limiting example. In an example, remediation client 322 creates a blank or default configuration file, which may be a formatted XML text file. User configuration 810 may also include personalization rules 240. An operating system 840 may provide a kernel, libraries, scheduling, and other services. Control hooks 842 may be inserted into operating system 840 and be configured to intercept specific directives or messages. These may be regulated by remediation client 322, which both reads from and writes to user configuration 810 as appropriate. Control hooks 842 may also log the activity of targeted behaviors on a per-application basis. This may then be presented to user 132, and based on this user 132 may be able to decide on the configuration at a later time as well. Control hooks 842 may be inserted into subsystems of an "Application Framework" level of an operating system stack, based on specific behavior. For example, to control SMS/Call behavior, control hooks 842 may be inserted into the system's telephony manager. Control hooks 842 may also be inserted for controlling other systems such as the location access Location Manager for controlling location services A running application 820 may include malware behavior. In some cases, running application 820 may include modifications from remediation server 110, which may enable or aid control hooks 842. Remediation client 322 may also provide personalization as described herein, including by reading personalization rules 240 from user configuration 810 and carrying out personalization rules via control hooks 842. Appropriate activities or errors may be recorded in activity log 850.

Figure 9:
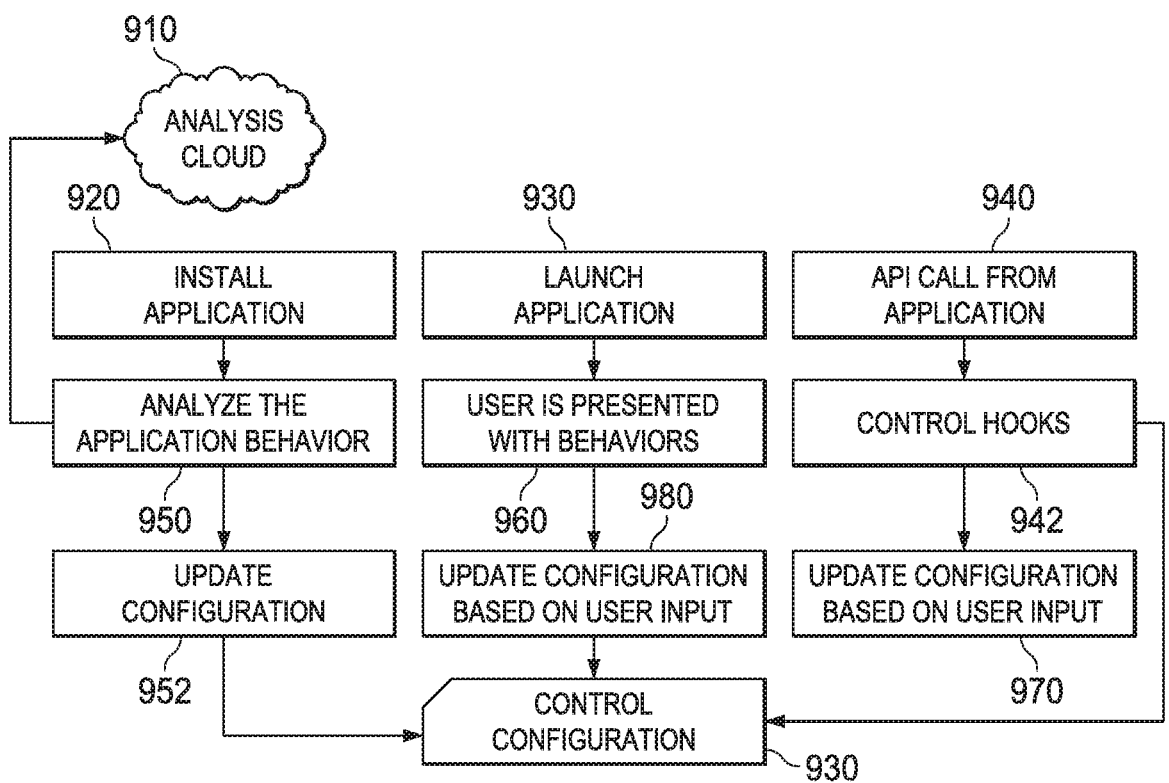
FIG. 9 is a block diagram of a remediation process over an example lifetime of an application according to one or more examples of the present specification.

FIG. 9 is a block diagram of a remediation process over an example lifetime of an application according to one or more examples of the present specification. In block 920, the user installs the application on client device 130. In block 950, remediation engine 200 analyzes the application, including receiving support from an analysis cloud 910, which may include for example remediation server 110. In this example, remediation engine 200 may reside in analysis cloud 910, and client device 130 may include a remediation client software 322. In block 952, remediation client 322 updates configuration data received from analysis cloud 910, and in block 930, the configuration data may be used to write a control configuration, which may be contained for example in user configuration 810, in personalization rules 240 or in a healed application 820.

In block 930, user 132 launches the personalized or healed application. In block 960, remediation client 322 may present user 132 with human-readable and actionable representation of behaviors, for example via a graphical user interface or via activity log 850. This may include the following options, by way of non-limiting example.

a. SMS—User 132 may choose to allow or block sending of SMS to specific numbers by the application. Remediation client 322 may also detect when the application tries to send SMS messages to premium numbers and block the behavior. The user may configure which numbers to block and which numbers to allow, either by whitelisting or by blacklisting.

b. Location—Remediation client 322 may be configured to detect when the application captures location data and forwards it to an internet address. User 132 may configure remediation client 322 to either block the application's access to location services or obfuscate the location by returning a false location. In some embodiments, the false location may be manifestly useless, such as latitude 0, longitude 0. In other cases, the location may be selected from a prepared list, or randomly generated to appear reasonable. In yet another embodiment, user 132 may elect to change the location accuracy from fine to coarse.

c. Contacts—Remediation client 322 may detect when the application accesses contacts and sends contact data to an internet address. User 132 may configure remediation client 322 to block the application's access to contacts, either by returning a blank list or by raising an exception, or user 132 may allow access to contacts but block forwarding of the contacts to the internet address. In yet another embodiment, user 132 may configure remediation client 322 to allow access to contacts but block forwarding of contact information to known malware internet addresses, for example as determined by GTI 290.

d. SD Card—Remediation client 322 may virtualize access to an SD card, so that the application is either given read-only access, write-only access, read-write access, or no access. Remediation client 322 may also provide access to a "virtual disk" that comprises only a portion of the SD card, so that the application cannot mount, read, or write other portions of the SD card.

e. Screen touch input—Remediation client 322 may disable receiving input on certain regions of the screen where advertisements or other undesirable links may be located. User 132 may also configure these areas of the screen to register a touch only after the user receives a confirmation dialog asking whether he truly intends to click on that area of the screen. The confirmation dialog may be inserted via control hooks 842.

f. Frequency—Access may be conditioned on an application not using certain services too frequently. For example, it may be permissible for an application to send a small number of text messages at long intervals, but not fifty messages in the same day.

The specific strategy used may be configured to provide expected return values from the framework APIs when these hooks are active so that the application does not detect an error state. This will ensure the application continues to function normally otherwise and not crash or behave abnormally.

Remediation client 322 may construct human-readable and actionable messages from APIs behavioral tags, based on API semantics. For example, remediation client 322 may include a stock template of messages, and may fill in appropriate nouns and verbs based on personalization rules 240. An example message may be based on the template: "This application <verb: reads><noun: SMS data> from your <noun: SMS inbox> and <verb: sends> them to a <noun: web site>." The final message may be "This application reads SMS data from your SMS inbox and sends them to a web site."

In block 980, remediation client software 322 may update user configuration 810 based on inputs received from user 132. These may then be provided to control configuration 930.

In block 940, the application may make a call to a particular platform API. In block 942, control hooks may be used to alter the behavior of the API for that particular call or for the application as a whole. In block 970, certain control hooks may solicit user input, and the user input may provide updates for user configuration 810. Control hooks may also provide results to control configuration 930.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Embodiment Implementations

There is disclosed in one example a remediation server comprising: a hardware platform, comprising a processor, a memory, and a network interface; and instructions encoded within the memory to instruct the processor to: receive an application binary; create an application logic model of the application binary; and create personalization rules for the application binary based on the application logic model.

There is further disclosed an example remediation server, wherein the executable instructions are further to instruct the processor to: disassemble the application binary; detect malware behavior in the application binary; and heal the application binary by inserting or removing instructions to ameliorate the malware behavior and recompile the application binary.

There is further disclosed an example remediation server, wherein creating personalization rules comprises receiving application programming interface (API) intelligence from a platform API intelligence database.

There is further disclosed an example remediation server, wherein creating personalization rules comprises receiving threat intelligence from a global threat intelligence database.

There is further disclosed an example remediation server, wherein creating personalization rules comprises performing heuristic analysis on the application binary.

There is further disclosed an example remediation server, wherein the application logic model comprises structured text configured to contain text objects representing application programming interface (API) elements.

There is also disclosed an example of one or more tangible, non-transitory computer-readable storage mediums having stored thereon executable instructions to instruct a processor to: receive a reputation for the application binary; if the reputation is malware, selectively install the application binary based on a user configuration input; and personalize the application by running the application concurrently with a personalization engine.

There is further disclosed an example of one or more tangible, non-transitory computer readable storage mediums, wherein the instructions are further to: if the reputation is malware, provide the application binary to a remediation server; and receive a healed application binary from the remediation server.

There is further disclosed an example of one or more tangible, non-transitory computer readable storage mediums, wherein the instructions are further operable to inhibit installation of the application binary until after receiving the healed application binary from the remediation server.

There is further disclosed an example of one or more tangible, non-transitory computer readable storage mediums, wherein the instructions to selectively install the application binary based on a user configuration input are further to: provide an interactive user interface element requesting confirmation to install the application binary; and install the application binary only if a positive response is received to the interactive user interface element.

There is further disclosed an example of one or more tangible, non-transitory computer readable storage mediums, wherein the instructions operable to provide an interactive user interface element are further operable to provide therewith an actionable, human-readable description of behaviors of the application binary.

There is further disclosed an example of one or more tangible, non-transitory computer readable storage mediums, wherein the instructions to personalize the application by running the application concurrently with a personalization engine are further operable to receive input from a user interface element to selectively provide access to system services.

There is further disclosed an example of one or more tangible, non-transitory computer readable storage mediums, wherein the system services are selected from the group consisting of geographic location, e-mail, short messaging service, telephony, contacts, internet access, camera, touchscreen, microphone, and speakers.

There is further disclosed an example of one or more tangible, non-transitory computer readable storage mediums, wherein the instructions are further to provide a remediation engine.

There is further disclosed an example of one or more tangible, non-transitory computer readable storage mediums, wherein the software instructions to provide the remediation engine are further to: disassemble the application binary; detect malware behavior in the application binary; and heal the application binary by inserting or removing instructions to ameliorate the malware behavior and recompile the application binary.

There is further disclosed an example of one or more tangible, non-transitory computer readable storage mediums, wherein the software instructions operable to provide the remediation engine are further operable to: create an application logic model of the application binary; and create personalization rules for the application binary based on the application logic model.

There is further disclosed an example of one or more tangible, non-transitory computer readable storage mediums, wherein the instructions are further to provide closed-loop analysis with a global threat intelligence service.

There is also disclosed an example computer-implemented method of providing malware remediation, comprising: receiving an application binary; creating an application logic model of the application binary; and creating personalization rules for the application binary based on the application logic model.

There is further disclosed an example method, further comprising: disassembling the application binary; detecting malware behavior in the application binary; and healing the application binary by inserting or removing instructions to ameliorate the malware behavior and recompile the application binary.

There is further disclosed an example method, wherein creating personalization rules comprises receiving application programming interface (API) intelligence from a platform API intelligence database.

There is further disclosed an example method, wherein creating personalization rules comprises receiving threat intelligence from a global threat intelligence database.

There is further disclosed an example method, wherein creating personalization rules comprises performing heuristic analysis on the application binary.

There is further disclosed an example method, wherein the application logic model comprises structured text configured to contain text objects representing application programming interface (API) elements.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions, that when executed cause the apparatus to perform the method of a number of the above examples.

There is further disclosed an example apparatus, wherein the apparatus is a computing system.

There is further disclosed an example of at least one computer readable medium comprising instructions that, when executed, implement a method or realize an apparatus as illustrated in a number of the above examples.

What is claimed is:

1. A remediation server comprising:
a hardware platform, comprising a processor circuit, a memory, and a network interface; and
instructions encoded within the memory to instruct the processor circuit to:
receive an application binary;
create an application logic model (ALM) of the application binary, wherein creating the ALM comprises disassembling the application binary, modeling application logic according to the disassembling, creating a data flow structure that represents a lifetime of an object that passes through the application logic, and stepping through the ALM while tracking the data flow structure;
determine, from the ALM, runtime application behavior modifications; and
create personalization rules for the application binary, including implementing one or more application behavior modifications.

2. The remediation server of claim 1, wherein the instructions are further to instruct the processor circuit to:
detect malware behavior in the application binary; and
heal the application binary by inserting or removing instructions to ameliorate the malware behavior and recompile the application binary.

3. The remediation server of claim 1, wherein creating personalization rules comprises receiving application programming interface (API) intelligence from a platform API intelligence database.

4. The remediation server of claim 1, wherein creating personalization rules comprises receiving threat intelligence from a global threat intelligence database.

5. The remediation server of claim 1, wherein creating personalization rules comprises performing heuristic analysis on the application binary.

6. The remediation server of claim 1, wherein the application logic model comprises structured text configured to contain text objects representing application programming interface (API) elements.

7. A computer-implemented method of providing malware remediation, comprising:
receiving an application binary;
creating an application logic model (ALM) of the application binary, wherein
creating the ALM comprises disassembling the application binary, modeling application logic according to the disassembling, creating a data flow structure that represents a lifetime of an object that passes through the application logic, and stepping through the ALM while tracking the data flow structure;
determine, from the ALM, runtime application behavior modifications; and
creating personalization rules for the application binary including implementing one or more application behavior modifications.

8. The method of claim 7, further comprising:
detecting malware behavior in the application binary; and
healing the application binary by inserting or removing instructions to ameliorate the malware behavior and recompile the application binary.

9. The method of claim 7, wherein creating personalization rules comprises receiving application programming interface (API) intelligence from a platform API intelligence database.

* * * * *